April 14, 1931.　　　　F. H. PAGE　　　　1,800,746
MEANS FOR CONTROLLING AEROPLANES
Filed Aug. 1, 1930　　　3 Sheets-Sheet 1
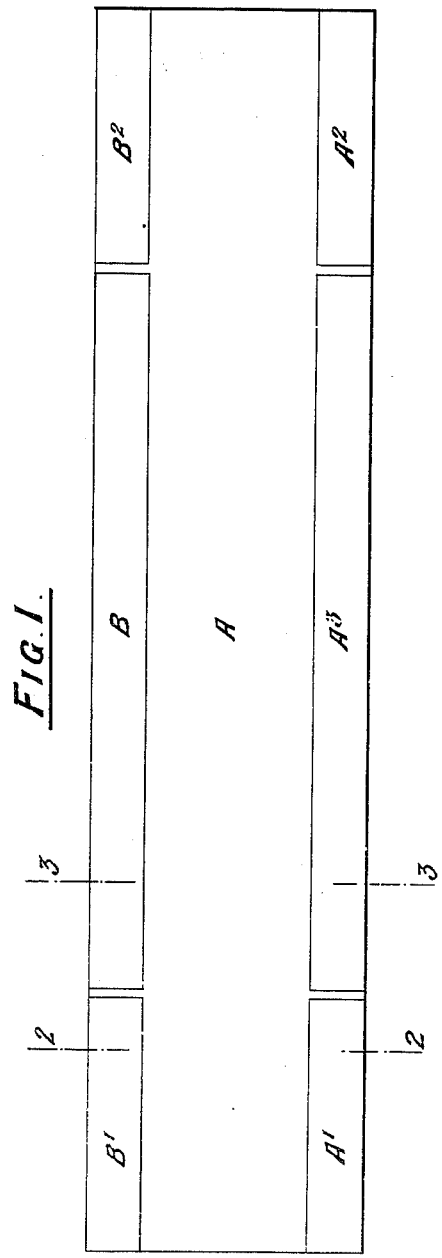
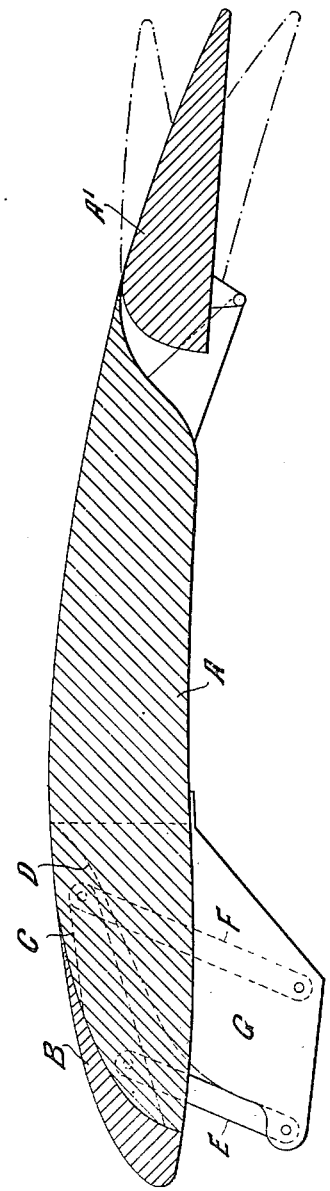
Frederick Handley Page
Inventor April 14, 1931.  F. H. PAGE  1,800,746
MEANS FOR CONTROLLING AEROPLANES
Filed Aug. 1, 1930   3 Sheets-Sheet 2

Frederick Handley Page
Inventor

April 14, 1931.　　　　F. H. PAGE　　　　1,800,746
MEANS FOR CONTROLLING AEROPLANES
Filed Aug. 1, 1930　　　3 Sheets-Sheet 3

Patented Apr. 14, 1931

1,800,746

UNITED STATES PATENT OFFICE

FREDERICK HANDLEY PAGE, OF LONDON, ENGLAND, ASSIGNOR TO HANDLEY PAGE LIMITED, OF LONDON, ENGLAND

MEANS FOR CONTROLLING AEROPLANES

Application filed August 1, 1930, Serial No. 472,401, and in Great Britain July 9, 1927.

In the specification of several preceding patents which describe means now commonly known as the "Handley Page slotted wing", whereby aeroplane wings are maintained in efficient flight at larger angles of incidence than has previously been practicable, various means have been illustrated and described for operating forwardly located auxiliary wings in order to separate them from the forward portions of the main wings, so as to open slots between the forwardly located wings and the main wings when desired.

We have ascertained in the trial of the various aeroplane constructions fitted in accordance with these mechanisms, and also by means of specific wind channel tests, that with change in the angle of incidence of main wings and forwardly located auxiliary wings, the resultant negative pressure or suction, acting on the upper surface of such forwardly located wings, becomes forwardly inclined relatively to the chord of the combined structure taken as a whole if a certain angle of incidence of the main wing has been exceeded. Consequently, should the forwardly located auxiliary wing be free to move about suitable guides, the forwardly located auxiliary wing will move away from the main wing automatically when the angle of incidence has increased sufficiently to induce the forwardly located auxiliary wing to leave the main wing. In a similar way the reduction in the angle of incidence of the structure as a whole, causes the forwardly located auxiliary wing to return to its position against the main wing.

These movements of the forwardly located auxiliary wing can only be secured if the guiding members by which the movement of the auxiliary wing is controlled will procure a smooth and regular proceeding of the auxiliary wing when travelling from slot-closed to slot-open position, without reaching intermediate positions where the characteristics of a true slot are no longer fulfilled and where the lift, acting on the auxiliary wing might reverse its direction and act against the forward motion. Also, it is necessary that no mechanism be interposed which will prevent the change of direction of the resultant air pressure causing the forwardly located auxiliary wing to adjust itself automatically.

This discovery has been applied to the controlling of aeroplanes in my co-pending application No. 248,919, filed January 23d, 1928, of which the present application is a continuation in part.

The object of the present invention is to apply the discovery to a specific form of the means for controlling aeroplanes.

In its broadest aspect the invention consists in providing in aeroplanes, the combination of a main wing having a forwardly located central auxiliary wing and having forwardly located end auxiliary wings one on either side of the central auxiliary wing, said central and end auxiliary wings being freely movable towards and away from said main wing within prescribed limits solely by the action of the air pressure on the surface of said auxiliary wings. It is obvious that in a banked turn, where the inner wing tip may be stalled while the rest of the wing is still travelling at speeds above the stalling point, the opening of the inner wing tip slot is ensured at the correct moment, by the subdivision of the front auxiliary wing into a central portion and two independent wing tip portions. The advantage of dividing the slot into independently acting portions will be appreciated when it is remembered that the inner wing tip not only travels on a lesser circle than the outer wing tip, and therefore travels slower, but during the initiating of the bank it is lowered in the air in comparison with the outer wing and thus has its angle of incidence still further increased relatively to the angle of incidence of the outer wing tip.

A further feature of this invention is the provision of a rearwardly located flap and means for connecting the rearwardly located flap to the forwardly located central auxiliary wing, so as to draw down the rearwardly located flap when the forwardly located central auxiliary wing moves away from the main wing.

Further features of the invention will be apparent from the construction described in the succeeding part of this specification and illustrated on the drawings and more particularly pointed out in the claiming clauses hereof.

Referring to the drawings,

Fig. 1 is a diagrammatic plan view illustrating the main wing with the forwardly located central and end auxiliary wings and the rearwardly located flap.

Fig. 2 is a section on the line 2—2 in Fig. 1, illustrating a main wing with a forwardly located end auxiliary wing, and showing these in the position in which the forwardly located end auxiliary wing and the main wing are close together in full lines, and the forwardly located end auxiliary wing in its forward position, into which it is drawn by the change in pressure of air on its surface, in chain dotted lines.

Referring to Fig. 1 of the accompanying drawings, A is a main wing, B is a forwardly located central auxiliary wing, and $B^1$ and $B^2$ are forwardly located end auxiliary wings, disposed one on either side of the forwardly located central auxiliary wing B. $A^1$ and $A^2$ are the ailerons of the main wing, while $A^3$ is a rearwardly located flap situated between the ailerons $A^1$ and $A^2$. The forwardly located end auxiliary wings $B^1$ and $B^2$ are located directly in front of the ailerons $A^1$ and $A^2$ and these forwardly located end auxiliary wings are independent of each other and of the ailerons $A^1$ and $A^2$, while the forwardly located central auxiliary wing B is located in front of the rear flap $A^3$ and is connected to the said rear flap $A^3$.

Figure 3:
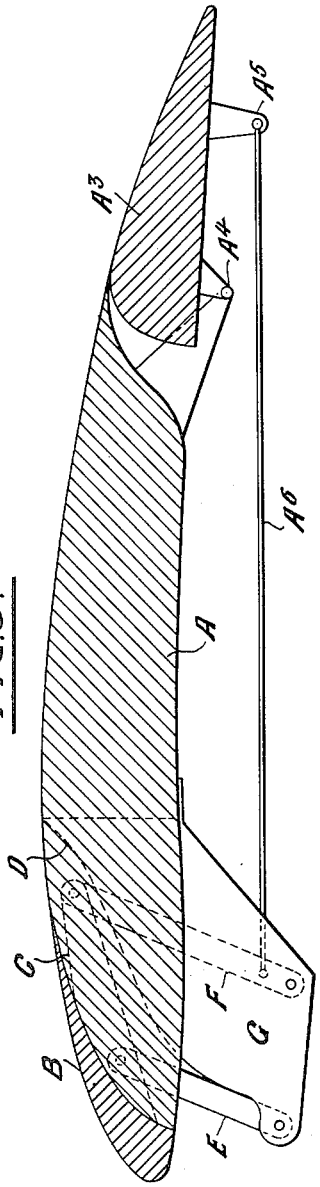
Fig. 3 is a section on the line 3—3 in Fig. 1, illustrating a wing in which the forwardly located central auxiliary wing and rearwardly located flap are interconnected. In the position illustrated the forwardly located central auxiliary wing and the main wing are close together forming an unbroken wing contour, and the rearwardly located flap is in its raised position.
Figure 4:
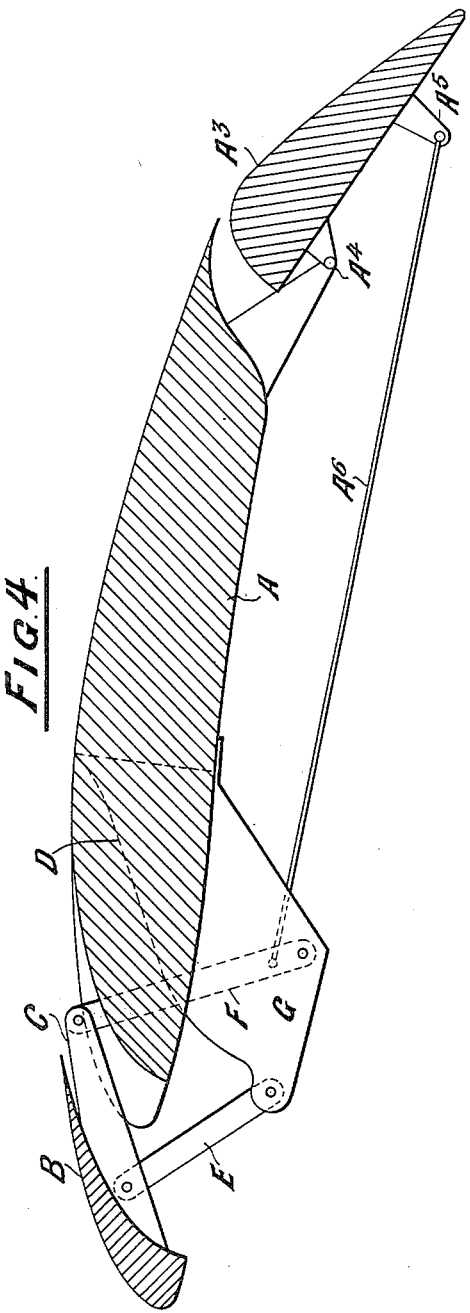
Fig. 4 is a similar view to Fig. 3 with the forwardly located central auxiliary wing drawn into its forward position by the change in pressure of the air on its surface, and with the rearwardly located flap drawn down by the movement of the forwardly located central auxiliary wing.

In the arrangement illustrated in Figs. 2, 3 and 4 the construction and arrangement of and the means for mounting the forwardly located central and end auxiliary wings, is the same, each auxiliary wing having rearwardly extending arms C attached to its inner surface, which arms enter recesses D in the front face of the main wing A. The arm C is supported on the upper pivots of links E and F, the lower pivots of these links being carried on the downwardly depending bracket G. For the particular wing section illustrated the link E is made shorter than the link F for the purpose of causing the front portion of the forward section B to move in a forward direction away from the wing A at a greater rate than the rear portion, thus ensuring the maintenance of a true form of slot. The comparative lengths of these links E and F may be determined according to the position it is required for the forwardly located auxiliary wing B to assume when it is moved forward under the influence of the change in air pressures.

It is desirable so to design the links which support the automatically operable forwardly located auxiliary wing as to cause the said forwardly located auxiliary wing to move to a point where the resultant forces are in equilibrium.

When the forwardly located auxiliary wing advances into the forward position, it opens a slot between itself and the main wing A, the auxiliary wing being guided in its travel by the radii of the links E and F which support the said forwardly located auxiliary wing. The lengths of the links E and F and the positions of their supporting pivots on the bracket G, determines the path of travel of the forwardly located auxiliary wing as it is moved forward under the action of the air pressure.

The ailerons $A^1$ and $A^2$ are mounted in the usual way.

The rearwardly located flap $A^3$ is pivotally mounted at $A^4$ on the main wing A, and as shown in Figs. 3 and 4, this flap is provided with an arm $A^5$ connected by a connecting rod $A^6$ to the link F supporting the forwardly located central auxiliary wing B. Thus the force acting on the forwardly located central auxiliary wing B, causing it to open into the position shown in Fig. 4, is utilised to pull down the rearwardly located flap $A^3$ into the position shown in Fig. 4 and to return the said rearwardly located flap $A^3$ to its raised position when the forwardly located central auxiliary wing B moves back to close the slot.

Figure 5:
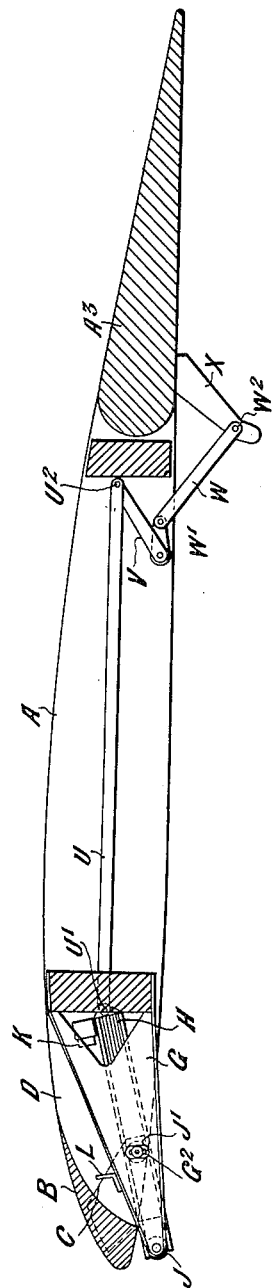
Fig. 5 is a sectional view corresponding to Fig. 3 but illustrating a modification in which the forwardly located central auxiliary wing is carried on runners, the said forwardly located central auxiliary wing being shown in the closed position with the rear flap in its raised position.
Figure 6:
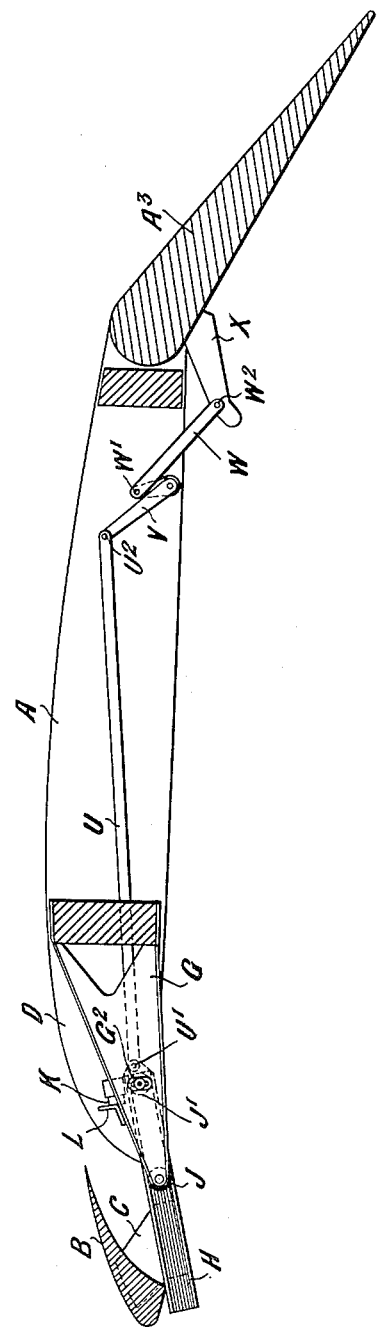
Fig. 6 is a similar view to Fig. 5 but with the forwardly located central auxiliary wing drawn into its forward position by the change in pressure of the air on its surface and with the rearwardly located flap drawn down by the movement of the forwardly located central auxiliary wing.

In the arrangement illustrated in Figs. 5 and 6, the arm C, instead of being supported on the links as in the first example illustrated in Figs. 2, 3 and 4, is attached to a sliding bar H which is conveniently of channel section suitable for enclosing two fixed rollers J and J¹ carried on the bracket G attached to the main wing A. In this construction, the forwardly located central auxiliary wing B is free to travel forwards following the line of the bar H when the air pressures on the said forwardly located wing draw it away from the position shown in Fig. 5 in which it is closed on the main wing, to the position shown in Fig. 6, so as to leave a slot between itself and the main wing. A buffer K on the inner end of the bar H limits the distance of travel of the bar by coming into contact with a stop L fixed on the bracket G. This bracket and stop, therefore, determine the extent of movement of the forwardly located central wing B, and consequently the maximum amount of opening of the slot.

The roller J¹ is shown in the drawing to be capable of a vertical adjustment in the slot G² formed in the bracket G permitting the roller J¹ to be raised or lowered for the purpose of adjusting the line of movement of the forwardly located central auxiliary wing B. This sliding bar supporting and guiding mechanism, may also be applied to the forwardly located end auxiliary wings B¹ and B² as well as to the forwardly located central auxiliary wing B.

On the inner end of the bar H, one end of a link U is pivotally connected at U¹. The other end of this link U is pivotally connected at U² to the end of one arm of a bell crank lever V and the other arm of this bell crank lever V is pivotally connected at W¹ to one end of a link W. The other end of this link W is pivotally connected at W² to an arm X fixed on the rear flap A³. By this means the movement of the centrally located auxiliary wing B from the position shown in Fig. 5 to the position shown in Fig. 6 causes the rear flap A³ to be pulled down from the position shown in Fig. 5 to the position shown in Fig. 6, and when the forwardly located central auxiliary wing B moves back to close the slot the rearwardly located flap A³ is returned to its raised position.

It is obvious that by fitting the central portion of the machine with automatic slot operating mechanism designed to delay the stalling point of the main portion of the wings to, say, 20°, and by fitting the outer ends of the wings with slot mechanism designed to delay the stalling point of such outer portions of the wings to, say, 25°, a machine may be produced which has an increased lift due to the wings lifting at angles not attained before the introduction of the slot mechanism, and which are safe from stalling when approaching the critical angle of the central portion of the machine.

A similar result may be obtained by connecting a central forwardly located wing to a rear flap and by having independently working wing tip slots with no connection to a rear flap. Thus the angle of incidence of the central part of the wing will be larger than at the wing tips so that the machine will retain her lateral stability even after the critical angle of the central part of the wing has been exceeded.

What I claim as my invention and desire to secure by Letters patent is:—

1. In aeroplanes, the combination of a main wing, a forwardly located central auxiliary wing and forwardly located end auxiliary wings, one on either side of the central auxiliary wing, said central and end auxiliary wings freely movable towards and away from said main wing within prescribed limits solely by the action of the air pressure on the surface of said auxiliary wings.

2. In aeroplanes, the combination of a main wing, a forwardly located central auxiliary wing, forwardly located end auxiliary wings, one on either side of the central auxiliary wing, said central and end auxiliary wings freely and independently movable towards and away from said main wing within prescribed limits solely by the action of the air pressure on the surface of said auxiliary wings, a rearwardly located flap, and means for connecting the rearwardly located flap to the forwardly located central auxiliary wing to draw down the rearwardly located flap when the forwardly located central auxiliary wing moves away from the main wing.

3. In aeroplanes, the combintion of a main wing, ailerons on said main wing, a forwardly located central auxiliary wing, movable towards and away from said main wing within prescribed limits solely by the action of the air pressure on the surface of the central auxiliary wing, a rear flap, means for connecting the central auxiliary wing to the rear flap to pull this flap down when the central auxiliary wing moves away from the main wing and to push the flap back when the central auxiliary wing moves towards the main wing, and forwardly located and independent end auxiliary wings, one on either side of the central auxiliary wing and in front of said ailerons, said end auxiliary wings freely movable towards and away from said main wing within prescribed limits solely by the action of the air pressure on the surface of said end auxiliary wings.

4. In aeroplanes, the combination of a main wing, a forwardly located central auxiliary wing, and forwardly located end auxiliary wings, one on either side of the central auxiliary wing, adapted to nest over the forward edge of the main wing, said central and end auxiliary wings freely movable away from the main wing in a forward direction for a limited distance solely under the influence of the air pressure on the surfaces of said auxiliary wings and freely movable back towards and into nesting relation with the main wing solely under the influence of the air pressure on the surfaces of the auxiliary wings.

5. In aeroplanes, the combination of a main wing, a forwardly located central auxiliary wing, and forwardly located end auxiliary wings, one on either side of the central auxiliary wing, adapted to nest over the forward edge of the main wing, said central and end auxiliary wings freely movable away from the main wing in a forward direction for a limited distance without substantially modifying their angular relation to the main wing solely under the influence of the air pressure on the surfaces of said auxiliary wings and freely movable back towards and into nesting relation with the main wing solely under the influence of the air pressure on the surfaces of said central and end auxiliary wings.

6. In aeroplanes, means for automatically establishing slots adjacent the forward edge of the main wing at large angles of incidence and automatically closing said slots at normal angles of incidence comprising a main wing, a forwardly located central auxiliary wing, and forwardly located end auxiliary wings, one on either side of the central auxiliary wing, said central and end auxiliary wings freely movable towards and away from said main wing within prescribed limits solely by the action of the air pressure on the surfaces of said central and end auxiliary wings.

7. In aeroplanes, means for automatically establishing slots adjacent the forward edge of the main wing at large angles of incidence and automatically closing said slots at normal angles of incidence comprising a main wing, a forwardly located central auxiliary wing, said central and end auxiliary wings freely movable towards and away from said main wing within prescribed limits solely by the action of the air pressure on the surfaces of said central and end auxiliary wings, a rear flap and means connecting the central auxiliary wing to the rear flap to pull this flap down when the central auxiliary wing moves away from the main wing and to push the flap back when the central auxiliary wing moves towards the main wing.

8. In aeroplanes, the combination of a main wing, a forwardly located central auxiliary wing and forwardly located end auxiliary wings, one on either side of the central auxiliary wings, one on either side of the central auxiliary wing, said central and end auxiliary wings freely movable towards and away from said main wing within prescribed limits solely by the action of the air pressure on the surface of said central and end auxiliary wings, and guides for the auxiliary wings which permit a to and fro sliding movement.

9. In aeroplanes, the combination of a main wing, a forwardly located central auxiliary wing and forwardly located end auxiliary wings, one on either side of the central auxiliary wing, said central and end auxiliary wings freely movable towards and away from said main wing within prescribed limits solely by the action of the air pressure on the surface of said central and end auxiliary wings, guides for said auxiliary wings which permit a to and fro sliding movement, a rearwardly located flap and means for connecting the rearwardly located flap to the forwardly located central auxiliary wing to draw down this rearwardly located flap when the central forwardly located auxiliary wing moves away from the main wing.

10. In aeroplanes, the combination of a main wing, a forwardly located central auxiliary wing and forwardly located end auxiliary wings, one on either side of the central auxiliary wing, said central and end auxiliary wings freely movable towards and away from said main wing within prescribed limits solely by the action of the air pressure on the surface of said central and end auxiliary wings, guides for the central and end auxiliary wings which permit a to and fro sliding movement, a rear flap and means for connecting the guide of the central auxiliary wing to the rear flap to pull this flap down when the central auxiliary wing moves away from the main wing and to push the flap back when the central auxiliary wing moves towards the main wing.

11. In aeroplanes, the combination of a main wing, ailerons on said main wing, forwardly located end auxiliary wings, in front of said ailerons freely movable towards and away from said main wing within prescribed limits solely by the action of the air pressure on the surface of said end auxiliary wings, a forwardly located central auxiliary wing movable towards and away from said main wing within prescribed limits solely by the action of the air pressure on the surface of the central auxiliary wing, a rear flap, means for connecting the central auxiliary wing to the rear flap to pull this flap down when the central auxiliary wing moves away from the main wing and to push the flap back when the central auxiliary wing moves towards the main wing, and guides for the central and end auxiliary wings which permit a to and fro sliding movement.

12. In aeroplanes, the combination of a main wing, a forwardly located central auxiliary wing, and forwardly located end auxiliary wings, one on either side of the central auxiliary wing, said central and end auxiliary wings freely movable towards and away from said main wing within prescribed limits solely by the action of the air pressure on the surfaces of said central and end auxiliary wings, means associating the central and end auxiliary wings and main wing adapted regularly to increase the angle which is formed between the chord of the central and end auxiliary wings and the chord of the main wing as the central and end auxiliary wings move forwardly.

13. In aeroplanes, means for automatically establishing slots adjacent the forward edge of the main wing at large angles of incidence and automatically closing said slots at normal angles of incidence, comprising a main wing, a forwardly located central auxiliary wing and forwardly located end auxiliary wings, one on either side of the central auxiliary wing, said central and end auxiliary wings freely movable towards and away from said main wing within prescribed limits solely by the action of the air pressure on the surface of said central and end auxiliary wings, and including means associating the central and end auxiliary wings and main wing adapted to assure that in all intermediate positions of the central and end auxiliary wings as well as in the fully open position the slots thus formed have their openings on the under surface of the wing in advance of the openings of the upper surface.

14. In aeroplanes, means for automatically establishing slots adjacent the forward edge of the main wing at large angles of incidence and automatically closing said slots at normal angles of incidence, comprising a main wing, a forwardly located central auxiliary wing and forwardly located and end auxiliary wings, one on either side of the central auxiliary wing, said central and end auxiliary wings freely movable towards and away from said main wing within prescribed limits solely by the action of the air pressure on the surfaces of said central and end auxiliary wings, and means associating the main wing and central and end auxiliary wings adapted to assure that in all intermediate positions as well as in the fully open position the slots thus formed between the upper and lower surfaces of the wing have their openings on the under side of the wing of greater width in the fore and aft directions than the openings on the upper side.

15. In aeroplanes, means for automatically establishing slots adjacent the forward edge of the main wing at large angles of incidence and automatically closing said slots at normal angles of incidence, comprising a main wing, a forwardly located central auxiliary wing, and forwardly located end auxiliary wings, one on either side of the central auxiliary wing, said central and end auxiliary wings freely movable towards and away from said main wing within prescribed limits solely under the action of the air pressure on the surfaces of said central and end auxiliary wings, and means associating the main wing and central and end auxiliary wings adapted to assure that in all intermediate positions as well as in the fully open position of the central and end auxiliary wings, the walls of the slots thus formed are curved rearwardly from the lower openings to the upper openings so as to direct the air passing through the slots with the minimum possible disturbance from the lower surface where there is pressure to the upper surface where there is suction.

16. In aeroplanes, the combination of a main wing, ailerons on said main wing and forwardly located end auxiliary wings one in front of each of the ailerons, said end auxiliary wings freely movable towards and away from said main wing within prescribed limits solely by the action of the air pressure on the surface of said end auxiliary wings.

In witness whereof, I have hereunto set my hand.

FREDERICK HANDLEY PAGE.